US007266986B2

(12) United States Patent
Shirley et al.

(10) Patent No.: US 7,266,986 B2
(45) Date of Patent: Sep. 11, 2007

(54) PORTABLE SYSTEM FOR MEASURING DYNAMIC PRESSURE IN SITU AND METHOD OF EMPLOYMENT THEREFOR

(75) Inventors: Fred D. Shirley, Clinton, MS (US); Vincent P. Chiarito, Vicksburg, MS (US); Stanley C. Woodson, Vicksburg, MS (US); Patrick Walter, Fort Worth, TX (US); Stephen Weis, Fort Worth, TX (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 185 days.

(21) Appl. No.: 10/991,219

(22) Filed: Nov. 18, 2004

(65) Prior Publication Data

US 2005/0103092 A1   May 19, 2005

Related U.S. Application Data

(60) Provisional application No. 60/523,088, filed on Nov. 19, 2003.

(51) Int. Cl.
  *G01L 27/00*   (2006.01)
(52) U.S. Cl. ..................................... 73/1.57
(58) Field of Classification Search ............... 73/1.57, 73/1.63–1.69
  See application file for complete search history.

(56) References Cited

U.S. PATENT DOCUMENTS

| | | | |
|---|---|---|---|
| 3,473,366 A * | 10/1969 | Smith ......................... 73/1.66 |
| 3,557,602 A * | 1/1971 | Frantz ........................ 73/1.66 |
| 3,664,176 A * | 5/1972 | Mangleburg ................. 73/1.64 |
| 4,464,123 A * | 8/1984 | Glover et al. ................ 434/268 |
| 4,499,751 A | 2/1985 | Riggs |
| 4,512,179 A * | 4/1985 | Umble et al. ................. 73/1.63 |
| H206 H * | 2/1987 | Newhall et al. ............. 73/1.66 |
| 4,698,997 A | 10/1987 | Hess et al. |
| 4,776,201 A | 10/1988 | Jones |
| 4,909,063 A | 3/1990 | Olsen |
| 5,016,466 A * | 5/1991 | Ness et al. .................... 73/1.64 |
| 5,027,641 A * | 7/1991 | Costello, Jr. .................. 73/1.64 |
| 5,065,611 A | 11/1991 | Angelosanto et al. |
| 5,402,666 A | 4/1995 | Chalpin |
| 5,461,901 A | 10/1995 | Ottestad |
| 5,693,871 A | 12/1997 | Stout et al. |
| 5,837,881 A | 11/1998 | Martin |
| 5,900,530 A | 5/1999 | O'Brien et al. |
| 6,321,585 B2 | 11/2001 | Sgourakes |
| 6,688,156 B2 | 2/2004 | Dietrich et al. |

* cited by examiner

*Primary Examiner*—Robert Raevis
(74) *Attorney, Agent, or Firm*—Earl H Baugher, Jr.

(57) ABSTRACT

A dynamic pressure testing or calibration system packaged as a portable unit for characterizing pressure sensors, such as transducers. Embodiments are packaged for carry on the body, are battery-operated, compatible with existing transducer mounts, and quickly learned and easily used by a single operator. The system supplies a pre-specified impulse (pressure pulse) of fluid, preferably a benign gas, such as air, or an inert gas such as helium or nitrogen. In select embodiments, the gas pulse has a fast rise time and its amplitude may be varied over a pre-specified dynamic range. For example, the rise time may emulate that of an impulse created during an explosion by a resultant pressure wave, i.e., less than 100 microseconds. Embodiments also incorporate a data acquisition capability that accurately captures and records both the supplied impulse and the response of the sensor under test.

26 Claims, 2 Drawing Sheets

PORTABLE SYSTEM FOR MEASURING DYNAMIC PRESSURE IN SITU AND METHOD OF EMPLOYMENT THEREFOR

RELATED APPLICATIONS

Under 35 U.S.C. §119 (e)(1), this application claims the benefit of prior co-pending U.S. Provisional Patent Application Ser. No. 60/523,088, Dynamic Pressure Calibration System, by Chiarito, filed Nov. 19, 2003, and is incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

BACKGROUND

Data from blast tests are collected and analyzed to establish the behavior of structures subjected to blasts (explosions). To collect this data, pressure transducers are mounted in models to be subjected to blasts. If these transducers are not calibrated properly, the test results are suspect. Since experiments such as these are costly and time-consuming, test personnel employ a dynamic pressure calibration system to ensure that transducers are operating within established parameters.

In an explosion, a rapid exothermic chemical reaction occurs, creating a hot and dense high-pressure gas. Expansion of this gas initiates a shock wave. The pressure at the front of the shock wave is the region of highest pressure, termed peak pressure. Calculating the area under the curve representing the pressure time history yields a measure termed the impulse. The total impulse characterizes the type, magnitude, and destructive capabilities of the blast. A pressure transducer converts parameters of the physical shock wave to an electrical signal, typically outputting a measurable voltage. The time required for this voltage signal to change from 10% of its final value to 90% of its final value is known as the rise time.

DETAILED DESCRIPTION

A dynamic pressure calibration system may be used to characterize dynamic performance of existing instrumentation in an expedient fashion and evaluate new instrumentation or proposed instrumentation designs. An embodiment of the present invention envisions a portable, ergonomic, intuitive calibration/testing unit for pressure sensors, such as pressure transducers.

Preferably an embodiment of the present invention is battery-operated, although it may be powered by other sources in benign applications, such as within a research laboratory. Further, an embodiment of the present invention is both easy and quick to use by a single operator, permitting, for example, approximately one transducer calibration every three minutes. An embodiment of the present invention is also geometrically compatible with existing mounts enabling it to couple to various pressure transducer mounts without leakage.

An embodiment of the present invention supplies a "deterministic pulse," i.e., a pre-specified pressure pulse set by test or calibration requirements. This deterministic pulse may be varied over a pre-specified dynamic range to meet changing requirements. Further, an embodiment of the present invention establishes a fast rise time, i.e., a pressure pulse rise time similar to what occurs in the pressure wave created during an explosion. A nominal rise time of less than about 200 µsec and preferably less than about 100 µsec is implemented in an embodiment of the present invention. An embodiment of the present invention also incorporates a data acquisition capability that accurately captures and records both the pressure pulse being supplied by it to the pressure sensor under test or calibration and the response of that pressure sensor. Specific embodiments of the present invention may also incorporate a "stand-alone" source of energy, such as a battery.

A method to characterize installed instrumentation systems using an embodiment of the present invention is also provided. Specifically, an embodiment of the present invention may be used to test the accuracy and response of pressure transducers used to collect data during blast events (explosions) as well as to calibrate them prior to test. To operate in this environment, an embodiment of the present invention supplies a pressure pulse with a short pre-specified rise time of less than about 200 microseconds (µsec).

Figure 1:
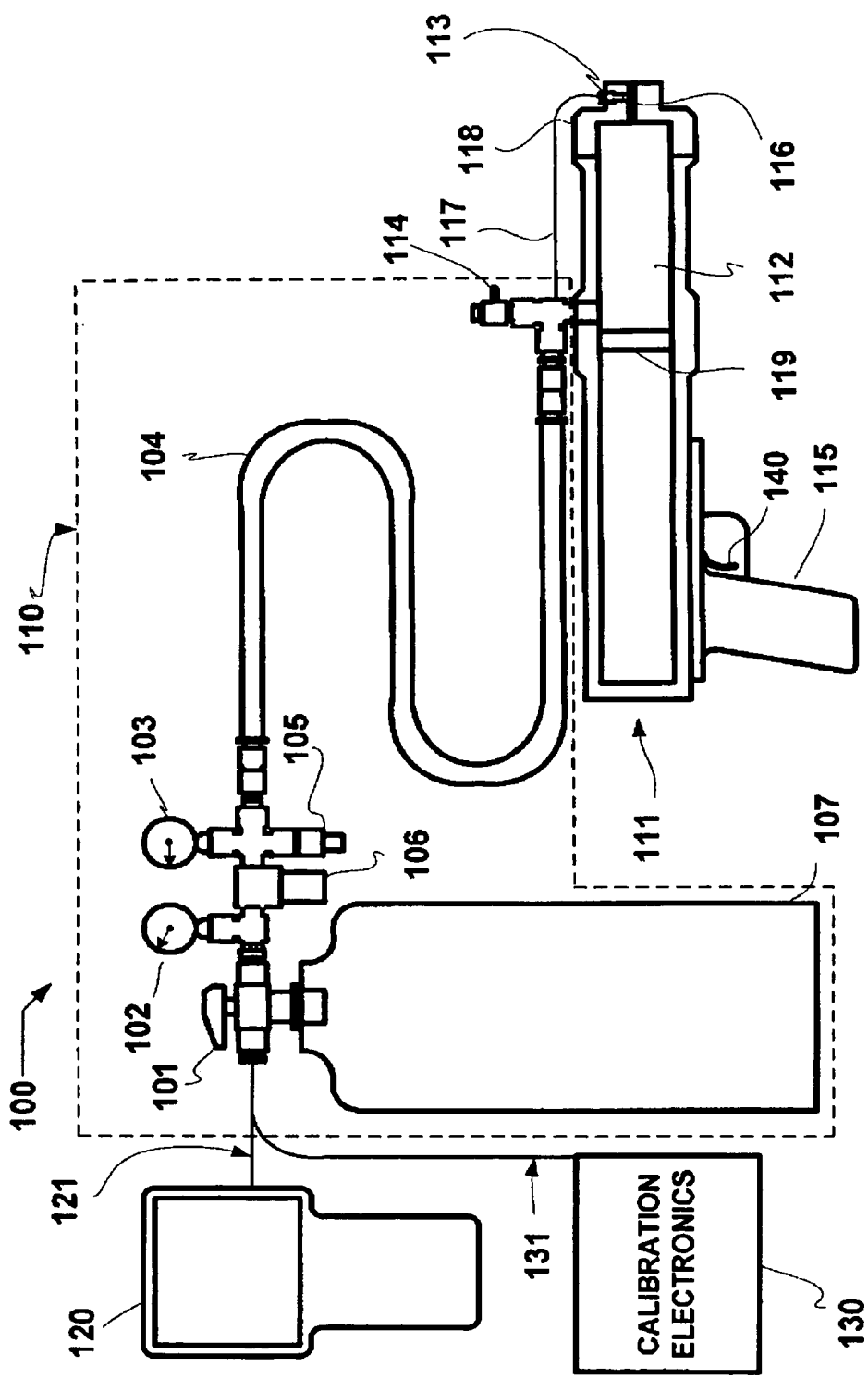
FIG. 1 is a figurative block diagram of an embodiment of the present invention.

Refer to FIG. 1. An embodiment of the dynamic pressure calibration system 100 of the present invention comprises: a pressurized gas system 110 a part of which is incorporated in a hand-held calibrator 111, an input/output (I-O)/display device 120, and calibration electronics 130 that optionally may be packaged entirely within the I-O/display device 120.

The pressurized gas system 110 supplies a pre-specified gas pressure to the calibrator 111, preferably sized to be hand held by an operator. A pressurized supply tank 107 filled with an inert gas, such as nitrogen or helium, or an inexpensive readily available gas such as ambient air, is provided in a portable package 100. Supply tank pressure is displayed on a provided pressure gauge 102. In operation, pressurized gas is released from a tank 107 through a pressure valve 101 that is closed after a selectable, pre-specified system pressure is reached. Released gas flows through a regulator 106 that maintains a pre-specified system pressure. A relief valve 105 is incorporated downstream of the regulator 106 to relieve pressure should a component fail. In a typical setup, the relief valve 105 may be set to release when pressures exceed 150 psi. Included with the system 100 is a chamber pressure gauge 103 that measures pressure inside the pressurized portion 112 of the calibrator 111.

From the relief valve 106, pressurized gas flows through tubing 104 to a bleed valve 114. The bleed valve 114 enables adjustment to pressure levels as needed. From the bleed valve 114, the pressurized gas flows into the pressured section 112 of the calibrator 111 for triggering by an operator via a "quick-opening" valve 119. A coupler 118 is fitted to the calibrator 111 to provide a seal between the calibrator 111 and the port (not shown separately) into which the pressurized gas is introduced. From the nozzle 116 of the calibrator 111 a reference transducer 113 captures a response pulse from the transducer being calibrated (or tested) and sends it via path 117 back to both the I-O/display device 120 via path 121 and the calibration electronics 130 via path 131. Paths 117, 121, 131 may be provided via one or a combination of electromagnetically conducting wire or wires, fiber-optics, pneumatic tubing, or be open to ambient air, i.e., wireless signal transmission via transceivers (not shown separately) incorporated in two or more of the devices: calibrator 111, I-O/display device 120, and calibrations electronics 130.

Figure 2:
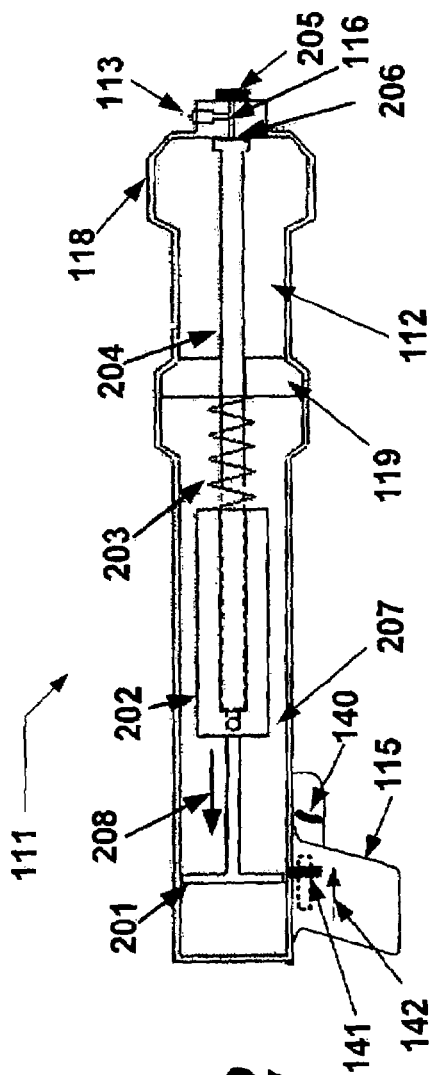
FIG. 2 is a plan view of an embodiment of the calibrator of an embodiment of the present invention.

In one embodiment of the present invention, the valve 119 is a "quick-opening" valve, such as a specialized poppet valve, whose function is to both release the supplied pressure and create the pressure pulse. This valve 119 is triggered by the operator for each test or calibration shot. Refer to FIG. 2. The calibrator 111 employing the specialized poppet valve 119 comprises at least: the Navy-designed poppet valve 119 with seal 206, spring 203, plunger 204, mass 202 that will move in the direction of the arrow 208 once the spring 203 is released by operation of the trigger 140, impact plate 201, trigger 140 as part of a trigger mechanism (complete mechanism not shown separately, but trigger 140 itself shown in FIGS. 1 and 2) within the grip 115, a triggering chamber 207, a pressurizing chamber 112, and a coupler 118 with O-ring 205.

In one embodiment of the present invention, the coupler 118 provides a seal 205 between the mount (not shown separately) and nozzle 116 and fits various mounts without any loss of pressure.

In one embodiment of the present invention, a reference transducer 113 located in the coupler 118 facilitates a signal measurement system that records the supplied pressure pulse and the response of the sensor under test/calibration.

In one embodiment of the present invention, the calibration electronics 130 comprise at least data acquisition electronics (not shown separately) to receive and record signals from the reference transducer 113. Data acquisition electronics comprise at least: a signal-conditioning amplifier, a micro-converter incorporating a microprocessor, an analog-to-digital (A/D) converter the output of which is sent to a memory device and suitable connectors and pathways (all components not shown separately).

Although shown as separate devices in FIG. 1, the components comprising the pressure bottle 107, the calibrator 111, the I-O/Display device 120, the various gauges 102, 103, and valves 101, 106, 105, hose 104, any "hard" paths 117, 121, 131 and the calibration electronics 130 may be packaged in a single package (not shown separately) that would provide fewer "shots" for calibration but be somewhat more portable for transporting long distances on foot or getting into tight spaces should that prove necessary. Also, the calibrator 111 could be provided in a smaller version and attached to a longer hose 104 to facilitate access to confined spaces. Given an average operator, the configuration shown in FIG. 1 may be fitted to an operator via known carrying devices such as backpacks, fanny packs, lumbar packs, belt packs and belts, and provide the capability for accomplishing approximately 100 test or calibration shots before recharging the pressure bottle or transferring the collected data to storage media or another processor.

An embodiment of the present invention may be carried and operated by one person. The operator wears a lumbar pack (not shown separately) that supports the supply tank 107, regulator 106, calibration electronics 130, I-O/Display 120, such as a hand held quick-reference oscilloscope (Multi-scope), gauges 102, 103, and support hardware, such as belts, straps, and additional pressure tubing (hose) 104 that may be needed. Pressure tubing 104 connects the supply tank 107 to the calibrator 111, also referred to as calibrator gun held by the operator. Once the system 100 has been assembled and checked for integrity, it is ready for use.

The purpose of the pressure system 110 is to safely supply a specified gas pressure to the calibrator 111. Prior to operation, the supply tank 107 is filled with an appropriate gas, such as nitrogen, helium, or air. The pressurized gas is released through the supply pressure valve 101 which is closed after the pre-specified system pressure is reached. The supply tank pressure is measured by the supply pressure gauge 102. The gas flows through a regulator 106 that the operator uses to control the pre-specified system pressure. Downstream of the regulator 106 is placed a relief valve 105 that operates in case of failure in one of the components that would cause the full tank pressure to flow through the system 100. This relief valve 105 may be set to open and release fluid to the atmosphere at pressures exceeding a nominal maximum pressure, e.g., 150 psi. Shown directly above the relief valve 106 in FIG. 1 is a chamber pressure gauge 103 that measures pressure currently inside the pressurizing portion 112 of the calibrator 111. The pressure level inside the regulator 106 can be read using the chamber pressure gauge 103 or an optional pressure gauge (not shown separately) located on the calibrator 111 should the calibrator 111 need to be separated from the supply tank 107 by a long pressure tube 104. The pressurized gas also flows to the bleed valve 114 through pressure tubing 104. The bleed valve 114 allows for adjustments in the pressurized gas pressure as desired. Once the chamber 112 inside the calibrator 111 is pressurized to a pre-specified level, the calibrator 111 is ready for use. The pressurized gas remains in the calibrator 111 until the operator triggers release via a trigger 140 mounted on the grip 115.

To use, the calibrator 111 is coupled to the installed sensor, typically a pressure transducer, by pressing the coupler 118 end of the calibrator 111 flat against the port housing the sensor of interest. The calibrator 111 is then triggered by the operator. The pressure pulse is released by the poppet valve 119 inside the calibrator 111. Once the pressure pulse has been fired from the calibrator 111, the operator may use the I-O/Display (Multi-scope 120 to check performance of both the system 100 and the sensor under test or calibration. After satisfactory pressure pulses have been delivered to the desired number of transducers, the operator may download data from the calibration electronics 130 for analysis, reporting, corrective action, and to archive the data.

Design considerations for an embodiment of the present invention include the mount geometry of the sensor under test/calibration, consistent pressure pulse delivery, system portability, and calibration electronics operation. Further, an embodiment of the present invention permits access to sensors positioned inside one of at least three different types of mounts: flush, cylindrical, and cone mounts (not shown separately). In one embodiment of the present invention, the calibrator 111 establishes a seal against all three types of mounts.

Three design criteria are established in selecting components of the calibration electronics 130: sampling rate, resolution, and size. A high sampling rate enables the system 100 to capture the fast rise time signals from the calibrator 111. High resolution ensures accurate signal representation for proper calibration. Components of compact size are used to facilitate mobility of the operator.

In one embodiment of the present invention, the calibration system 100 provides a known pressure impulse for at least one hundred shots (tests or calibrations). Thus, for this embodiment, the supply tank 107 is sized to provide at least 100 shots each at the same pressure, e.g., in one embodiment 50 psi is specified. This design may be scaled in size and performance parameters to meet requirements of an individual user or organization.

In one embodiment, the supply tank 107 is a Catalina M9 that weighs 1.6 Kg (3.6 lbs) and has a rated maximum allowable working pressure of 2015 psi. The tank 107 is approximately 28 cm (11 in.) tall and 11.2 cm (4.4 in.) in diameter. The supply pressure gauge 102 permits the operator to know the approximate number of remaining calibrations or tests possible. There is a roughly linear relationship between the pressure in the calibrator 111 and the number of remaining shots. A tank 107 pressurized to a full 2000 psi was experimentally determined to allow 300 shots at 50-psi pressure at the calibrator nozzle 116. If a 100-psi calibrator pressure is specified, there would be 150 shots available from this tank 107. A pressure gauge 102 manufactured by Wilca Corp. is suitable for fitting to the Catalina M9 tank 107. It has a range from 0 to 3000 psi and is accurate within 1.5% of full scale. The gauge case is made of 316 stainless steel with a 6.4 cm (2.5-in.) diameter. The Kenrnac KCP Compact Pressure Regulator 106 is suitable for use with this embodiment. It is 7.6 cm (3 in.) tall and has a diameter of 3.3 cm (1.3 in.). It weighs 0.45 Kg (1 lb) and has a maximum rated inlet pressure of 3600 psig. This regulator 106 can deliver a pressure between 0 and 100 psi. A relief valve 105 manufactured by Swagelok ensures that the pressure of the pressurized gas will not exceed a setting in the range of 50 to 150 psi. The relief valve 105 is 3.8 cm (1.5 in.) long and has a .0.63 cm (0.25 in.) diameter. The pressure tubing 104 is a flexible 0.63 cm (0.25 in.) diameter steel-braided hose covered by rubber to provide durability. It is rated at 3000 psi with a 4:1 safety factor. There are two interchangeable chamber pressure gauges 103 that can be employed depending on the gauge range appropriate for the particular calibration or test. These gauges 103 are manufactured by Wika and one ranges from 0 to 100 psi and the other from 0 to 30 psi. They are accurate to 1.5% of full scale. The chamber pressure gauge case is made of 304 stainless steel and has a 6.4 cm (2.5 in.) diameter. The bleed valve 105 is manufactured by Swagelok Corp. and is made of 316 stainless steel. It is 3.8 cm (1.5 in.) long with a diameter of 0.63 cm (0.25 in.). The maximum allowable working pressure for the Swagelok valve 105 is 8000 psi. The calibrator 111 comprises: the Navy-designed poppet valve 119 with seal 206, spring 203, plunger 204, mass 202, impact plate 201, trigger 140 as part of a trigger mechanism (complete mechanism not shown separately, but the trigger 140 itself is shown in FIGS. 1 and 2, cocking mechanism 141 operated by moving in the direction of the arrow 142, and coupler 118 with O-ring 205. The parts of the calibrator 111 are manufactured to specification. The calibrator 111 delivers a pressure pulse that simulates that produced by a blast for calibration or test of installed pressure sensors, typically pressure transducers. This pressure pulse is created by the pressurization of the chamber 112 inside the calibrator 111 and the breaking of the seal 206 on the poppet valve 119. When the calibrator 111 is triggered, the spring 203 accelerates the mass 202 into the impact plate 201 within the triggering chamber 207 and forces the poppet valve 119 to open.

The poppet valve system 119 allows the pressure pulse to be delivered to the face of the sensor under test/calibration. The front end of the valve plunger 204 is pulled back from the sealed position when the spring 203 accelerates the mass 202 into the impact plate 201. The seal 206 instantaneously breaks allowing the pressurized gas stored in the pressurized chamber 112 to escape across the reference transducer 113 with a pressure pulse having a rise time of less than 100 μsec.

In one embodiment of the present invention, a spring 203 with a constant of 4.7 lbs/in. is used to accelerate the mass 202 in the poppet valve system 119. In one embodiment of the present invention it is compressed about 5.0 cm (2 in.) initially. When the calibrator 111 is triggered, the spring 203 hits the mass 202 with enough momentum to lift the plunger 204 and break the seal 206. The accelerated mass 202 contacts the impact plate 201 along the rear of the plunger 204. The plunger 204 spans between the triggering chamber 207 and the pressurized chamber 112. An O-ring (not shown separately) with Teflon coating on its outer diameter is placed around the plunger 204 between the pressurized 112 and triggering 207 chambers to seal the pressurized chamber 112 off. The smooth Teflon coating on the O-ring reduces friction during movement of the plunger 204. The impact of the mass 202 on the plate 201 forces the plunger 204 in the pressurized chamber 112 to pull away from the reference transducer 113, breaking the seal 206 and initiating a pressure pulse. The plunger 204, made to specification, is constructed of brass and weighs 140 g (5 oz). It is 22 cm (8.75 in.) long and has a diameter of 1.9 cm (0.75 in.).

In an embodiment of the present invention, the mass 202 is forced by the spring 203 into the impact plate 201. The impact plate 201 is made to specification, constructed of stainless steel, and weighs 84 g (3 oz). It is 2.9 cm (1.125 in.) long and has a diameter of 2.2 cm (0.875 in.).

The reference transducer 113 is placed in the coupler 118 of the calibrator 111 to measure the pressure pulse delivered by the calibrator 111. In one embodiment of the present invention, it is placed as close as possible to the seal 206 of the poppet valve 119 to obtain the most accurate waveform. A quartz transducer used in an embodiment of the present invention is manufactured by Dytran Corp. and is 3.3 cm (1.32 in.) long with a 0.63 cm (0.25 in.) diameter and weighs 6 g. It can operate at temperatures ranging from −100 to 250° F. with a 500 psi range providing 10 mV/psi.

In an embodiment of the present invention, the triggering mechanism (entire mechanism not shown separately, but the trigger 140 itself is shown in FIGS. 1 and 2 is a commercially manufactured device modified to specification. It is used to release the spring 203 to fire the mass 202 into the impact plate 201. A grip 115 that is used with the 1911 version of the 0.45 automatic service pistol, the ANS 0.45 (trigger frame), is provided as a complete system and attached to the triggering section chamber 207. The grip 115 is machined out of a solid block of 6061 aluminum and weighs 140 g (5 oz). The grip 115 may be fitted with a rubber grip cover (not shown separately), such as one made by Hogue Corp., to provide comfort for the operator.

The pressure pulse generated by the calibrator 111 must be delivered to the face of the sensor under test/calibration. A coupler 118 is used to deliver this pressure pulse via a nozzle 116 in the coupler 118 by connecting the front end of the calibrator 111 to the mount (not shown separately) of the sensor under test/calibration. In one embodiment of the present invention, the coupler 118 is a stainless steel cap that screws onto the front end of the calibrator 111. Connected to this cap is a 225 O-ring 205 with a 3.6 cm (1.4 in.) inner diameter to encircle the nozzle 116 and 0.32 cm (0.125 in.) cross section for sealing the calibrator 111 to the mount. This embodiment of the coupler 118, made to specification, has a diameter of 6.4 cm (2.5 in.) and weighs 235 g (8.4oz).

In a first embodiment of the present invention, the coupler 118 provides a fast rise time but is too small to hold a reference transducer 113. In a second embodiment of the present invention, the coupler 118 as depicted in FIGS. 1 and 2, provides a rise time that is not as fast as the smaller coupler 118 of the first embodiment but houses a reference transducer 113 for signal comparison to the response of the sensor under test/calibration.

In an embodiment of the present invention, the calibrator 111 is constructed of stainless steel to specification and comprises both a pressurized 112 and triggering 207 chamber. The pressurized chamber 112 stores the desired level of pressurized gas for each individual calibration. The triggering chamber 207 contains the working mechanics of the poppet valve 119. The pressurized chamber 112 of this embodiment has an inner diameter of 3.8 cm (1.5 in.) and a length of 10.5 cm (4.125 in.).

Figure 3:
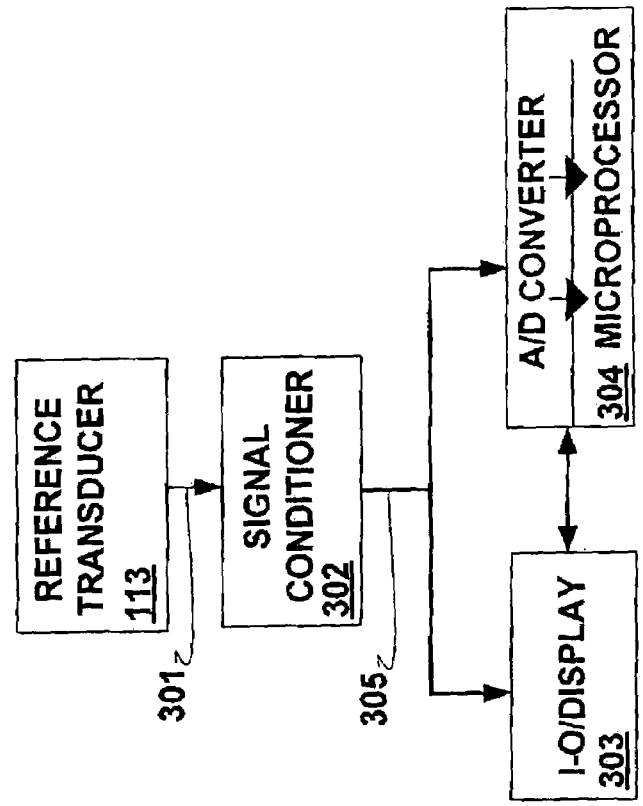
FIG. 3 is a block diagram of an embodiment of the data paths used with an embodiment of the present invention.

Refer to FIG. 3 showing the data flow for an embodiment of the present invention. The reference transducer signal 301 collected at the exit nozzle 116 of the calibrator 111 is fed to signal conditioning circuitry 302 from which it may be transmitted to either the I-O/Display 303, an A/D converter/microprocessor 304, or both. The I-O/Display 303 and the A/D converter/microprocessor 304 may also be in direct operable communication for further display of archived data, processing control, downloading data, etc.

Signal conditioning circuitry 302 is used to amplify the output from the reference transducer 113 to a specified range and "clean up" the signal 301 so that the A/D converter/microprocessor 304 can digitize it and process it in real time or save it for further analysis, or do both. In an embodiment of the present invention, a signal-conditioning amplifier manufactured by Dytran Corp. as the model 4105C is used to amplify the input signal 305 to the A/D-Microprocessor 8051 304. This amplifier can take an input of 10 mV/psi and provide a full-scale output not to exceed the input limit of the A/D converter/microprocessor 304 typically 2.0 volts. The amplifier has selectable voltage gains of ×1, ×10, ×100, and is powered by two 9-Volt batteries. It has dimensions of 3×10×7.5 cm (2.2×4×2.9 in.) and weighs 310 g(11 oz).

The A/D converter/microprocessor system 304 in the calibration electronics 130 samples the analog signal 305 and digitizes the signal for further processing, storage, or both. This is accomplished by microprocessor directives that instruct the A/D converter when to sample and at what rates to capture data. In an embodiment of the present invention, a micro-converter manufactured by Analog Devices Corp. as ADuC812 is employed. It contains a multi-channel 12-bit ADC with embedded FLASH MCU and has an operating temperature range from −40 to 185° F.

In an embodiment of the present invention a multi-scope is used as the I-O/Display 120. It provides the operator a quick-look check of the calibration pulse provided to the sensor under test/calibration. It is marketed as the Wittig Multiscope, a hand-held oscilloscope that may be used to display the output signal 301 from the reference transducer 113. The Multiscope weighs approximately 0.75 Kg (1.65. lbs) with dimensions of 20×9×5.5 cm (7.87×3.54×2.16 in.). The Multiscope is a two channel, 20 Msa/s, and 8-bit resolution scope. It has a sampling rate accuracy within 0.5% of its sample. Knowing the output directly after the calibration allows for real time resolution of any errors at the sensor being tested or calibrated.

Diverse test locations dictate that an embodiment of the present invention be transportable. Federal Aviation Administration (FAA), U.S. Department of Transportation (DOT), International Civil Aviation Organization (ICAO), and Transport Canada (TC) regulations govern the transport of pressurized vessels. These regulatory agencies specify that any pressurized vessel carried onto an aircraft be refillable with a non-corrosive, non-combustible, and non-flammable gas. Thus the tank 107 used in an embodiment of the present invention may be specified to adhere to these regulations. Further, in areas that do not permit local procurement of appropriate inert gasses or approved tanks, an air compressor may be used to pressurize an empty supply tank 107 that is transported with the system 100.

Testing of an embodiment of the present invention demonstrated that three parameters impacted the rise time of the pressure pulse: valve release, acoustic cavity used in the coupler 118, and type of gas used. Test results using various gasses showed that helium yielded the fastest rise time followed by nitrogen and air in that order.

Standard quick-opening valves, such as ball, poppet, and solenoid valves, were tested to establish the fastest possible opening time resulting in the shortest rise time. A Navy-designed poppet valve yielded an average rise time of 54 μsec, however, the Navy-designed poppet valve worked only in the vertical direction. Thus, an embodiment of the present invention incorporates a spring-assisted accelerated mass in the Navy-designed poppet valve to enable operation in any orientation.

The size of the cavity within the coupler 118 between the pressurized chamber 112 and the sensor under test/calibration influences rise time as well. Testing demonstrated that as acoustic cavity length increases rise time increases. However, as cavity width increases rise time decreases. Thus the coupler 118 of an embodiment of the present invention is relatively short in comparison to its width (or diameter) as shown in FIG. 1.

The quality of the seal of the acoustic cavity to the sensor under test/calibration also affects operation of the calibrator 111. The coupler 118 is a compromise between the rigidity needed to handle pressure and the flexibility required to seal with an easily delivered force from the operator. If there is excessive compression of the sealing device on the front of the coupler, e.g., an O-ring, a static pressure build-up occurs within the acoustic cavity, thus changing the amplitude of the desired pressure step. An alternative, such as a weep hole, is implemented to diminish the effect of pressure build-up.

An embodiment of the present invention records an output signal 301 from the reference transducer 113 within the calibrator 111 and compares the signal 301 to the output signal from the sensor under test/calibration. An embodiment of the present invention also incorporates a quick reference package (not shown separately) that enables the operator to perform a check of the system 100 prior to use.

An embodiment of the present invention uses calibration electronics 130 comprising a micro-converter incorporating at least an 8051 microprocessor and a 12-bit analog-to-digital (A/D) converter that communicates with external SRAM memory to permit accurate data acquisition. This configuration allows ease of programming, speed, and resolution. Further, it has full-scale accuracy in recording rise times for a 100 μsec or less sample period. Compared with other similar versatile systems, it is also cost effective.

The pressure system 110 contains and transports the pressurized gas for the calibrator 111. The operator opens the supply pressure valve 101 by rotating the valve 101 to the left and reads the supply pressure on the supply pressure gauge 102. Using the regulator 106, the operator then sets the calibrator working pressure at the desired level between 5-100 psi by referring to the chamber pressure gauge 103 downstream from the regulator 106. Either a 0-30 psi or 0-100 psi gauge may be used depending on the pressure pulse amplitude desired. The regulator 106 controls a continuous gas flow at the regulated pressure until the supply pressure valve 101 is closed.

In an embodiment of the present invention, the calibration electronics 130 is contained within a lumbar pack (not shown separately). This package includes the data acquisition and signal conditioning required to operate the reference transducer 113. The signal conditioner 302 is activated using a power switch, and, after an indicator LED (not shown separately) lights, a gain of 10 may be selected. The system is now ready to calibrate and record the pre-specified pressure pulse. To view the pressure pulse actually being delivered, the operator has two options. The first option is to view directly the pressure pulse through the I-O/Display 120, such as the hand-held Multiscope. The operator reads the rise time and amplitude of the delivered pressure pulse on the Multiscope. The second option is to remove the memory card from the A/D converter board and make a connection to a separate PC (not shown separately). In an embodiment of the present invention, with the appropriate software, the operator can view the output of the reference transducer 113 for up to 14 calibrations and compare the data with the calibrated data from the sensor under test/calibration. In one embodiment of the present invention, the operator allows delay time between each calibration for the A/D converter 304 to reset.

This delay time is used for several reasons. In one embodiment of the present invention, the trigger for the micro-converter to begin sampling is the signal 301 from the reference transducer 113 itself. Once the signal 301 from the reference transducer 113 reaches a level above 150 mV, a comparator (not shown separately) forces hardware pin J7-4 (software bit P3.3) (not shown separately) low, thus triggering the analog-to-digital converter 304 to begin sampling. Because the trigger does not begin from zero, no reference zero level can yet be made. Sampling occurs for approximately six milliseconds before the converter 304 is stopped. The delay, nominally thirty seconds, occurs while electronic circuitry in the signal conditioner 302 settle to account for the RC time constant. After this delay, software once again enables the converter 304 to sample for a time period of approximately one millisecond. This short sampling period establishes the reference zero level that can be used for the calibration.

In one embodiment of the present invention, the operator loads the pressure system 110 into the lumbar pack provided and straps on the pack. To begin the calibration or test procedure, the operator first places the cocking mechanism 141 on the grip 115 in the firing position by pulling the cocking mechanism in the direction of the arrow 142 thereby pushing the lever-arm (not shown separately) forward along the backend of the calibrator 111. Once the trigger 140 is secured in the firing position by operation of the cocking mechanism 141, the pressurizing chamber 112 of the calibrator 111 is closed. The operator then pressurizes the chamber 112 by adjusting the regulator 106 to allow the desired pressurized gas pressure into the calibrator 111. If the operator over-pressurizes the calibrator 111, he/she can bleed gas from the opening by the bleed valve 114 located on top of the calibrator 111 once the supply pressure valve 101 has been closed. The operator then couples or seals the end of the calibrator 111 to the mount of the sensor under test/calibration. Next, the operator pulls the trigger 140 to deliver the known pressure pulse to the sensor under test/calibration. The I-O/Display (Multiscope) 120 indicates proper performance of the calibrator 111 by providing an immediate reference check of the signal 301 from the reference transducer 113. In one embodiment, the calibration process is completed 30 seconds after each calibration is begun.

In one embodiment, safety and ergonomic considerations were as detailed below.

Major safety issues involved in the calibration system are as follows: pressure containment, pressure relief, supply tank puncture, and operator injury.

The pressure fittings, gauges, tubing, and connections are designed and tested to a factor of safety of 20 with respect to normal operating pressure. The maximum allowed working pressure in each of these components is above the working range of the actual pressure system ensuring a safe working environment.

In the event of regulator 106 failure, a relief valve 105 is located immediately downstream from the regulator 106 to prevent over-pressurizing of the calibrator 111. The maximum working pressure of the calibrator 111 is limited to less than 150 psi by this valve 105.

Supply tank 107 puncture is minimized by carrying the supply tank 107 across the upper part of the operator's body in a padded lumbar pack. Securing the supply tank 107 reduces concern of accidentally dropping or puncturing the tank 107.

The final calibration system design minimizes possibility of operator injury by isolating the moving parts of the calibrator 111 from potential interference with the operator's body. The moving parts include the poppet valve 119 and the spring 203/mass 202 system. Because the poppet valve 119, mass 202, and spring 203 are located within the stainless steel triggering section 207 of the calibrator 111, there is minimal risk of injury by moving parts. The location of the grip 115 on the underside of the calibrator 111 prevents the operator's hand from interfering with the triggering mechanism.

The major ergonomic issues associated with the calibrator 111 are: weight, angle of use, force of firing, and repetitive motion.

The calibrator 111, with a final weight of 3.3 Kg (7.2 lbs), is to be balanced or stabilized by the operator's hands prior to calibration. The pre-fabricated grip 115 is of standard design allowing for single-handed use. For ergonomic purposes, the operator's free hand should be used to support the front end of the calibrator 111 to distribute more evenly the weight and to avoid wrist flexion.

A lumbar pack also helps to distribute the carrying load of the necessary instruments and components. The lumbar pack contains the tank 107, electronics 130, I-O/Display (Multiscope) 120, calibrator 111, and other necessary equipment such as couplers, O-rings, etc. With the tank 107 and electronics 130 placed in the main compartment of the pack, the operator closes the zippers around the neck of the tank 107 and secures them using a provided carabineer (not shown separately).

The major ergonomic issues associated with the calibration system lumbar pack are as follows: weight distribution and ease of use. The lumbar pack is worn on the operator's right hip and strapped around his or her left shoulder. Wearing the pack on the right allows for easiest use due to the orientation of the gauges 102, 103, tubing 104, and regulator 106. The distribution of the weight in this pack occurs mostly at the hip and extra support is provided by a shoulder strap. This way, the weight of the pressure system 110 and calibrator 111 are redistributed to other areas of the operator's body rather than being fully concentrated on the hips. With these multiple straps, the lumbar pack can conform to any operator body type. A hip strap minimizes any side-to-side swinging motion while the shoulder strap serves as a weight distributor.

The angle of use of the calibrator gun can range from 0° directly in front of the operator to 90° above and/or to the side of the operator. The possibility of injury associated with use at extreme angles is minor because the calibration process requires only a few seconds to complete.

The force required to hold the seal for calibration was determined experimentally to be a maximum pressure of 28 lb-ft.

Extensive testing was done to completely characterize the behavior of an embodiment of the calibration electronics 130, pressure system 110, and calibrator 111. Testing objectives included:

Rise Time Testing—This test quantified the variations and consistency of the rise times of the pressure pulse with respect to different supplied pressures, gases, and couplers.

Pressure Testing—This test quantified the accuracy and consistency of the magnitude of the pressure pulse with respect to different supplied pressures and gases.

Reference to Field Transducer Comparison—This test quantified the differences in the reference transducer 113 pressure readings against the sensor under test/calibration pressure readings.

Variable Gas Testing—This test quantified the difference when using the pressurized gases air, nitrogen, and helium.

Temperature Effects Testing—This test quantified any differences in pressure pulse delivery when the calibrator 111 was exposed to or operated in various temperature-controlled environments.

Number of Deliverable Calibration Shots—This test provided the maximum number of deliverable calibration shots by the supply tank 107.

Pressure System 110 Sealing Test—These tests included extended pressurized system 110 testing.

Mount Testing—This test portrayed a possible outcome of the calibration system 100 when coupled with various transducer mounts.

Laboratory Equipment to Calibration Electronics 130 Comparison—This test calibrated the calibration electronics 130 against referenced laboratory equipment to verify the calibration electronics accuracy.

Complete System 100 Testing—This test completely characterized the entire calibration system 100, including the calibration electronics 130, calibrator 111, and pressure system 110.

Particular to each test is a detailed equipment list, parts list, and test setup. The following procedures detail these items for each test completed.

The rise time, pressure, and reference/field transducer comparison tests were accomplished simultaneously. Nitrogen was chosen as the supply pressure in these sets of tests because it is relatively inexpensive and its natural behavior was similar to air. The XT-190 (0-25 psi) pressure transducer was the transducer under test, and the output of this field transducer was conditioned by an amplifier built to specification with gain set at 10. The amplified analog signal was directed to a Philips PC23096 oscilloscope where the output of the transducer could be viewed and recorded. A Dytran 2300V3 (0-500 psi) pressure transducer was selected for the reference transducer 113. The output of the reference transducer 113 was routed to a Dytran 2900 Signal Conditioner, and from the signal conditioner the output was directed to another Philips PC23096 oscilloscope. Both oscilloscopes, triggered by the input of the pressure pulse, internally calculated the rise time of the pressure pulse and recorded approximately 5 ms of the pressure pulse (1 ms before the pressure pulse and 4 ms after).

The set of rise time/pressure tests recorded the rise times of the reference transducer 113 and the field transducer and the exact pressure amplitudes of twenty calibration shots at a supply pressure of 5 psi. This set of tests was repeated at 10 psi, again with the XT-190 pressure transducer.

When the pressure magnitude was increased to 20 psi, the transducer under test was exchanged with the HKS (0-500 psi) pressure transducer. The rise times and the exact pressure amplitudes of twenty calibration shots at a supply pressure of 20 psi were recorded for the reference transducer 113 and the transducer under test. This set of tests was repeated at 30 psi, 50 psi, 70 psi, and 84 psi, with the HKS pressure transducer as the transducer under test.

The gases air, nitrogen, and helium were investigated. For this set of tests, an identical test setup to the rise time/pressure test employed the HKS (0-500 psi) pressure transducer as the transducer under test. The tests recorded the rise times and the exact pressure amplitudes of ten calibration shots for each of the reference transducer 113 and the transducer under test. The first test used air, at a pressure of 30 psi, as the supplied pressurized gas. An identical set of tests was repeated with nitrogen and helium as the supplied pressurized gas.

The only difference noted in these tests was the rise time of the pressure pulse. The pressure pulse rise time was the fastest with helium and slowest with air.

The calibrator 111 was exposed to three distinct temperature environments during operation, comparable to what the calibrator 111 might experience in field use. The temperature gradient was applied only to the coupler and seals in the calibrator 111 because these components would be most affected by a temperature difference. To prevent damage to the reference transducer 113 due to extreme temperature changes, a fast rise time coupler (not shown separately) was used in place of the reference transducer 113. In these tests, a test setup identical to the rise time/pressure test was instituted using the HKS (0-500 psi) pressure transducer as the transducer under test.

The area around the coupler 118, including the coupler seal 205 and the dynamic seal 206 was heated to 32° C. (90° F.) by using a hair dryer. The average temperature of the surrounding air was measured for ten calibration shots and the rise time and exact pressure amplitude of the transducer under test recorded. The supplied pressurized gas was nitrogen at a pressure of 30 psi.

The area around the coupler 118 was heated to a temperature of 58.5° C. (137.4° F.) using the same parameters as the 32° C. test for ten shots. After the calibrator 111 and components returned to room temperature, the area around the coupler 118 was surrounded by ice in an insulated chest and allowed to cool until arriving at a temperature of 10° C. (50° F.) and tested for ten shots as above.

Over the range of heating and cooling the area around the coupler 118, the calibrator 111 operated satisfactorily.

The number of deliverable shots in the supply pressure tank 107 was calculated to be 230. Experimentally, the number was found to be 267 calibration shots. This was accomplished by filling the supply tank 107 to its maximum capacity and repeatedly firing the calibrator 111 until no more reliable calibration shots could be obtained.

To ensure the functionality of the pressure system 110, it was pressurized to a maximum and left pressurized for a 24-hour period. The pressure and limits of the pressure system 110 remained stable.

A series of tests were conducted with the calibrator 111 coupled to two transducer mounts: a flush mount was used with the XT-190 (0-25 psi) pressure transducer and a cylindrical mount was used with the HKS (0-500 psi) pressure transducer. For the cylindrical mount tests, nitrogen, at a pressure of 30 psi, was the supplied pressurized gas. The rise times as well-as the exact pressure amplitudes of five calibration shots of the reference transducer 113 and the transducer under test were recorded.

The flush mount did not affect the output pressure pulse because it allowed the calibrator 111 to couple directly with the transducer under test. However, the cylindrical mount did alter the pressure pulse as it traveled to the transducer under test, slowing rise times but not altering the amplitude of the pressure pulse.

As part of the complete system test, the calibration electronics 130 were tested against calibrated laboratory equipment. The calibrated laboratory equipment remained the same throughout the entire testing process. The calibration electronics 130 compared favorably to the laboratory equipment's output.

A complete field environment test combined the calibration electronics 130, calibrator 111, pressure system 110, and calibrated reference laboratory oscilloscopes. The supply tank 107 was pressurized using a portable air compressor to 210 psi and then assembled to the calibrator 111. The calibrator 111 was connected to the calibration electronics 130 and a calibrated laboratory Philips PC23096 oscilloscope. Fourteen calibration shots were done with supply pressures of 10 psi and 40 psi. All rise times and exact test and reference transducer 113 pressure pulse outputs were recorded by both the calibration electronics 130 and calibrated laboratory oscilloscopes.

There was not extensive variance in the rise times of the pressure pulses displayed by the two systems. The pressure pulse rise times do not vary with respect to the amplitude of the pressure pulse. A comparison between the reference transducer coupler 118 and the fast rise time coupler reveals an approximate 25% increase in rise time with the fast rise time coupler. The variance in the data still illustrates a blast-like rise time with all three gases (air, nitrogen and helium) and with both the reference transducer coupler 118 and the fast rise time coupler.

Refer to Table 1. For nitrogen, the greatest percent error between the output of the reference transducer 113 and the transducer under test was 1.67% at a pressure of 5 psi. The accuracy of the entire calibration system was calculated to be 1.6%. A confidence interval of 95% was calculated and listed for all averages of pressure pulse amplitudes.

TABLE 1

Comparison of Reference and Field Transducer Pressure Pulse Amplitude for Nitrogen

| Supply Pressure (psi) | Average Pressure Reference Transducer (psi) | Average Pressure Transducer Under Test (psi) | Largest Percent Error (%) |
|---|---|---|---|
| 5 | 4.80 ± 0.12 | 4.72 ± 0.05 | 1.67 |
| 10 | 9.51 ± 0.13 | 9.45 ± 0.07 | 0.58 |
| 29.5 | 28.85 ± 0.35 | 29.24 ± 0.10 | 1.36 |
| 50 | 48.44 ± 0.71 | 48.93 ± 0.42 | 1.01 |
| 70.7 | 69.53 ± 1.39 | 69.82 ± 0.83 | 0.42 |
| 85 | 83.46 ± 0.82 | 83.13 ± 0.77 | 0.39 |

Varying the magnitude of the pressurized gas has no effect on the rise times of the pressure pulses of either the reference transducer 113 or the transducer under test. Additionally, it was found that different operators did not affect the results obtained from the calibrator 111. The calibrator 111 provided a consistent pressure pulse output within a 1.67% accuracy.

While the invention has been described in terms of its preferred embodiments, those skilled in the art will recognize that the invention can be practiced with modifications within the spirit and scope of the appended claims. For example, although the system is described in specific examples related to transducer calibration in a blast environment, it may be adapted to other applications that capitalize on its portability, ergonomics, and dynamic range. Thus, it is intended that all matter contained in the foregoing description or shown in the accompanying drawings shall be interpreted as illustrative rather than limiting, and the invention should be defined only in accordance with the following claims and their equivalents.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The abstract of the disclosure is provided to comply with the rules requiring an abstract that will allow a searcher to quickly ascertain the subject matter of the technical disclosure of any patent issued from this disclosure. 37 CFR §1.72(b). Any advantages and benefits described may not apply to all embodiments of the invention.

We claim:

1. An autonomous portable system for use by a single operator to determine in situ at least one characteristic of a pressure sensor under test in response to an impulse provided by said system, comprising:
   a container of pressurized fluid;
   means for generating from said container said impulse at a pre-specified rise time less than about 200 μsec and for varying said impulse over a pre-specified dynamic range;
   means for conveying said impulse to said pressure sensor under test, said means for conveying being geometrically compatible with known pressure sensor mounts, said means for conveying further being able to operate in any orientation;
   means for data acquisition,
   wherein said means for data acquisition captures and records at least one characteristic of said impulse and at least one characteristic of the response of said pressure sensor under test to said impulse; and means for packaging said system to permit carry upon the person of a single operator and deployment by said single operator.

2. The system of claim 1 in which said container is a tank suitable for containing at least one type of pressurized gas, said tank suitable for carry by said operator of said system.

3. The system of claim 1 in which said means for generating comprises:
a calibrator comprising:
a triggering section at the proximal end of said calibrator;
a pressurizing section at the distal end of said calibrator, said pressurizing section in operable communication with said triggering section,
a coupler at the distal end of said pressurizing section;
a nozzle incorporated in said coupler;
a housing enclosing at least parts of said pressurizing and said triggering sections,
wherein said distal and said proximal ends are defined in respect to said operator, and
wherein said pressurizing section contains said fluid prior to release thereto
a trigger mechanism incorporating at least a trigger in operable communication with a lever arm;
a cocking mechanism in operable communication with at least said lever arm,
wherein operation of said cocking mechanism at least closes said pressurizing section to permit pressurization of said pressurizing section by said operator;
a release mechanism, comprising at least in part:
a first seal in operable communication with the distal end of said pressurizing section;
a mass incorporated in said triggering section;
a spring in operable communication with at least said lever arm of said trigger mechanism, said spring to communicate with said mass,
wherein compression of said spring is accomplished by actuating said cocking mechanism;
a poppet valve in operable communication with at least said coupler and incorporating a plunger in operable communication with at least said mass and said first seal,
wherein, upon operation of said trigger mechanism, said poppet valve releases supplied pressure to create said impulse, and
wherein said poppet valve is biased by at least said spring to enable operation of said calibrator in any orientation;
a second sea mounted on the exterior of said coupler and encircling said nozzle of said calibrator, said second seal establishing a leak proof surround about said pressure sensor under test;
a reference transducer mounted externally on the distal end of said coupler and in operable communication with at least said nozzle; and
at least one grip in operable communication with said trigger mechanism and incorporating at least part of said cocking mechanism and a trigger guard, said guard shielding at least part of said trigger;
a first pressure valve in operable communication with at least said container;
a first pressure gauge in operable communication with at least said container;
a pressure regulator in operable communication with at least said first pressure gauge;
a second pressure gauge in operable communication with at least said pressure regulator and said pressurizing section;
a second valve in operable communication with at least said second pressure gauge, said second valve downstream of said pressure regulator,
wherein said second valve relieves pressure should a component of said means for generating fail;
a third valve in operable communication with said second valve, said second pressure gauge and said pressurizing section of said calibrator,
wherein said third valve is a bleed valve; and
a conduit in operable communication with said second valve and said third valve.

4. The system of claim 3 in which connections between said calibrator, said I/O-display and said means for data acquisition are selected from the group consisting essentially of: electromagnetically conducting wire, fiber-optics, pneumatic tubing, wireless signals via transceivers incorporated in two or more of said calibrator, said I/O-display and said calibration electronics, and combinations thereof.

5. The system of claim 3 in which said poppet valve comprises a poppet valve that facilitates said pre-specified rise times of less than about 200 μsec.

6. The system of claim 3 in which said coupler is fabricated to have a length along the long axis of said calibrator comparable to or less than the width of said coupler, said width measured perpendicular to said length,
wherein said coupler adapts to couple to at least one type of mount employed with said pressure sensor under test, and
wherein said second seal provides a seal between said coupler and said mount.

7. The system of claim 6 in which said coupler adapts to fit at least any mount selected from the group consisting of flush, cylindrical, and cone type mounts for said pressure sensor under test.

8. The system of claim 7 in which said coupler further comprises:
a stainless steel cap fitted to the distal end of said pressurizing section of said calibrator; and
at least one vent established as a weep hole in said coupler,
wherein said vent is implemented to diminish the effect of pressure build-up.

9. The system of claim 1 in which said means for data acquisition comprises:
a signal conditioner;
an A/D converter in operable communication with said signal conditioner;
at least one microprocessor in operable communication with said A/D converter; and
at least one input/output (IO)/display device in operable communication with at least said microprocessor.

10. The system of claim 9 further comprising said reference transducer in operable communication with at least said signal conditioner.

11. The system of claim 10 in which said system enables one calibration at a minimum of approximately every three minutes.

12. The system of claim 1 in which said pre-specified rise time is less than about 100 μsec.

13. The system of claim 1 in which said fluid is selected from the group consisting essentially of: inert gas, nitrogen, helium, ambient air, and combinations thereof.

14. The system of claim 1 in which said pressure sensor under test is a pressure transducer.

15. The system of claim 1 further comprising means for carrying said system.

16. A method employing an autonomous portable system suitable for carry on the person of the operator, said method for determining at least one response characteristic of a pressure sensor under test in situ, comprising:
   providing a portable container of pressurized fluid incorporating a first pressure valve;
   providing a first conduit incorporating a pressure regulator and a second pressure valve, said first conduit in operable communication with said first valve,
   wherein said second valve is a relief valve;
   releasing, via said first valve, a portion of said fluid into said first conduit;
   providing a first pressure gauge in operable communication with said container and said regulator;
   providing a second conduit downstream from said regulator;
   closing said first valve after a pre-specified pressure is attained in said second conduit;
   providing a third pressure valve at the termination of said second conduit,
   wherein said third valve is a bleed valve enabling adjustment to maintain said pre-specified pressure;
   providing a second pressure gauge in operable communication with at least said pressure regulator;
   providing a calibrator comprising:
      a triggering section at the proximal end of said calibrator;
      a pressurizing section at the distal end of said calibrator, said pressurizing section in operable communication with at least-said triggering section;
      a coupler at the distal end of said pressurizing section;
      a nozzle incorporated in said coupler;
      a housing enclosing at least pads of said pressurizing and said triggering sections,
   wherein said distal and said proximal ends are defined in respect to said operator, and
   wherein said pressurizing section contains said fluid prior to release thereof;
      a trigger mechanism incorporating at least a trigger in operable communication with a lever arm;
      a cocking mechanism in operable communication with at least said lever arm,
   wherein operation of said cocking mechanism at least closes said pressurizing section to permit pressurization of said pressurizing section by said operator;
      a release mechanism, comprising at least in part:
         a first seal in operable communication with the distal end of said pressurizing section;
         a mass incorporated in said triggering section;
         a spring in operable communication with at least said lever arm of said trigger mechanism, said spring to communicate with said mass,
      wherein compression of said spring is accomplished by actuating said cocking mechanism;
         a poppet valve in operable communication with at least said coupler and incorporating a plunger in operable communication with at least said mass and said first seal,
      wherein, upon operation of said trigger mechanism, said poppet valve releases supplied pressure to create said impulse, and
      wherein said poppet valve is biased by at least said spring to enable operation of said calibrator in any orientation;
         a second seal mounted on the exterior of said coupler and encircling said nozzle of said calibrator, said second seal establishing a leak proof surround about the port of said pressure sensor under test;
         a reference transducer mounted externally on the distal end of said coupler and in operable communication with said nozzle; and
         a grip in operable communication with said trigger mechanism and incorporating at least part of said cocking mechanism and a trigger guard, said guard shielding at least part of said trigger;
   providing a second pressure gauge in operable communication with said second conduit and said pressurizing section,
   wherein said second pressure gauge measures and displays relative pressure inside said pressurizing section;
      as necessary, employing said third pressure valve to adjust said pressurized fluid to said pre-specified pressure within said pressurizing section;
      coupling said calibrator to said pressure sensor under test;
      triggering, via said triggering mechanism, said pressurized fluid at said pre-specified pressure as a pressure pulse with a pre-specified rise time; and
      collecting said response via means for data acquisition.

17. The method of claim 16 wherein said container is a portable supply tank pressurized with a gas.

18. The method of claim 17 providing said gas selected from the group consisting essentially of: inert gas, nitrogen, helium, ambient air, and combinations thereof.

19. The method of claim 16 in which said means for data acquisition incorporates an input/output (I/O) display device.

20. The method of claim 16 further providing said pulse at a rise time of less than about 200 μsec.

21. The method of claim 16 further providing said pulse at a rise time of less than about 100 μsec.

22. The method of claim 19, providing said means for data acquisition further comprising:
   a signal conditioner;
   an A/D converter in operable communication with said signal conditioner; and
   a microprocessor in operable communication with at least said A/D converter.

23. The method of claim 16 wherein said coupler is fabricated to have a length along the long axis of said calibrator comparable to or less than the width of said coupler, said width measured perpendicular to said length, and to incorporate at least one vent established as a weep hole in said coupler, and
   wherein said vent is implemented to diminish the effect of pressure build-up, and
   wherein said coupler adapts to couple to at least one type of mount employed with said pressure sensor under test.

24. The method of claim 23 further providing said coupler adapted to fit mounts selected from the group consisting of flush, cylindrical, and cone type mounts for said pressure sensor under test.

25. The method of claim 16 further providing connections between said calibrator, said I/O-display device and said microprocessor selected from the group consisting essentially of: electromagnetically conducting wire, fiber-optics, pneumatic tubing, wireless signals via transceivers incorporated in two or more of said calibrator, said I/O-display and said microprocessor, and combinations thereof,
   wherein said I-O/display indicates performance of said calibrator by providing a reference check via a signal from said reference transducer.

26. The method of claim 16 further comprising: loading at least part of said portable system into a backpack and strapping said pack onto an operator.

* * * * *